Nov. 26, 1957
V. J. CRIMI
2,814,370
MOTOR CONTROL AND BRAKE PEDAL DEVICE
Filed Dec. 28, 1954
2 Sheets-Sheet 1
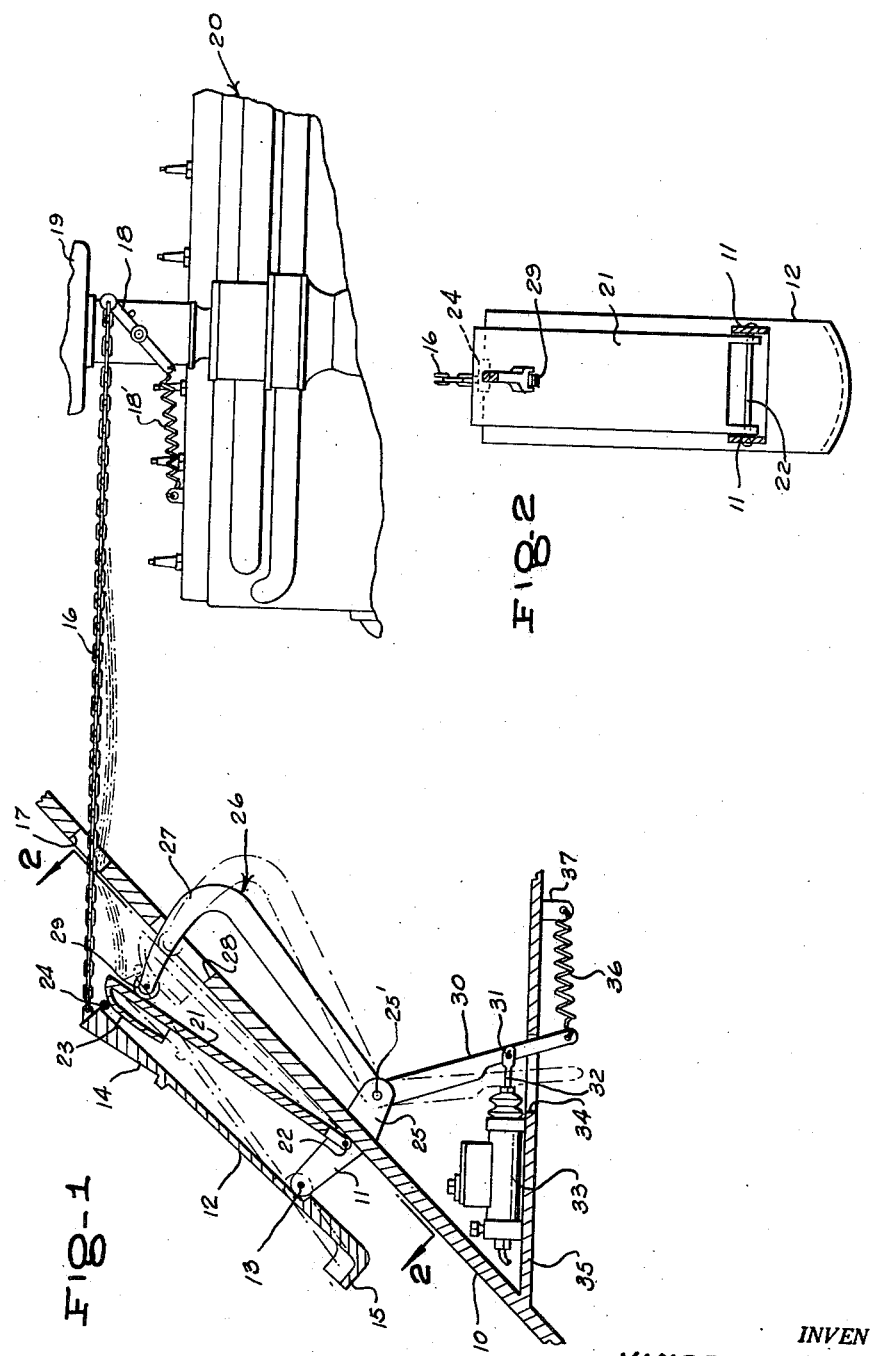
INVENTOR.
VINCENT J. CRIMI
BY
McMorrow, Berman & Davidson
ATTORNEYS Nov. 26, 1957  V. J. CRIMI  2,814,370
MOTOR CONTROL AND BRAKE PEDAL DEVICE
Filed Dec. 28, 1954  2 Sheets-Sheet 2
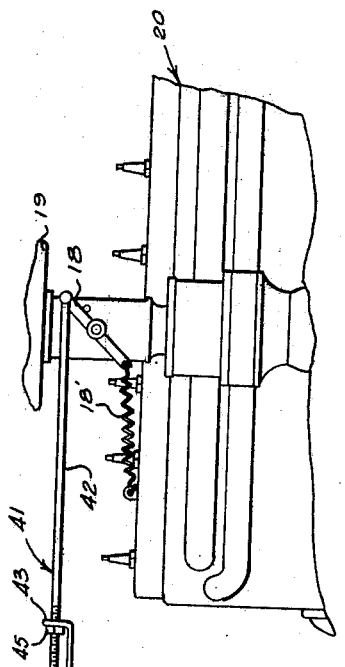
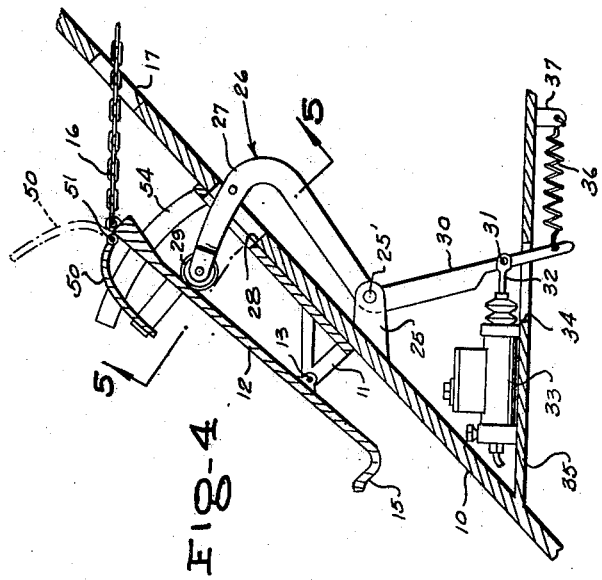
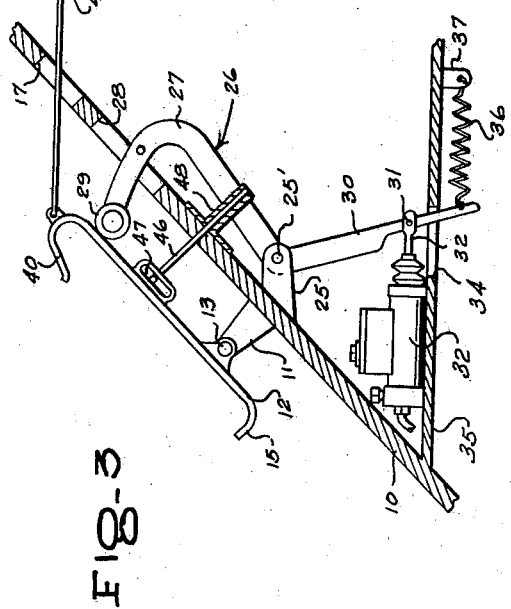
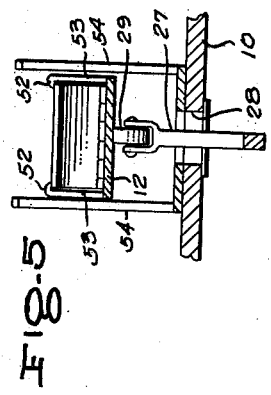
INVENTOR.
VINCENT J. CRIMI
BY
McMorrow, Berman + Davidson
ATTORNEYS United States Patent Office 2,814,370
Patented Nov. 26, 1957

2,814,370

MOTOR CONTROL AND BRAKE PEDAL DEVICE

Vincent J. Crimi, Philadelphia, Pa., assignor to Safo-Matic Brake Co. Inc., Long Island City, N. Y., a corporation of New York Application December 28, 1954, Serial No. 478,081

4 Claims. (Cl. 192—3)

This invention relates to a motor control and brake pedal device.

An object of the invention is to provide a motor control and brake pedal device in which movement of the pedal in one direction accelerates the motor, and movement of the pedal in the opposite direction applies the brakes.

Another object of the invention is to provide a motor control brake pedal device which is attachable to the carburetor throttle and to the hydraulic brake system of a motor vehicle and which is positive in action.

A further object of the invention is to provide a motor control and brake pedal device which is simple in structure and which is commercially feasible.

Other and further objects and advantages of the present invention will become apparent from the following description taken in conjunction with the accompanying drawings, in which:

Figure 1 is a side elevational view of the motor control and brake pedal device of the present invention operatively connected to the carburetor throttle of the motor vehicle internal combustion engine and to the brake cylinder of such vehicle, the full lines indicating the device in neutral position and the dotted lines indicating the device in braking position.

Figure 2 is a view taken on the line 2—2 of Figure 1.

Figure 3 is a side elevational view of another form of the motor control and brake pedal device of the invention operatively connected to the carburetor throttle of the motor vehicle internal combustion engine and to the brake cylinder of such vehicle, the device being shown in neutral position.

Figure 4 is a side elevational view of a further form of the motor control and brake pedal device of the invention operatively connected to the carburetor throttle of the motor vehicle internal combustion engine and to the brake cylinder of such vehicle, the device being shown in neutral position.

Figure 5 is a view taken on the line 5—5 of Figure 4.

Referring to Figure 1, the numeral 10 designates the motor vehicle floorboard from the upper face of which projects perpendicularly a pair of fixed brackets 11 in parallel spaced relation. A pedal 12 is positioned longitudinally of and spaced above the floorboard 10 and is connected intermediate its ends to the upper ends of the brackets 11 for rocking movement about an axis transverse of said brackets or pin 13 carried by the upper ends of said brackets. The pedal 12 has a rest 14 adjacent its upper portion for the support of the shoe sole of the vehicle operator, and on the lower end of the pedal 12 there is a heel support 15 for receiving the heel of the shoe of the vehicle operator. To the upper end of the pedal is connected one end of a chain 16, the chain extending slidably through an aperture 17 formed in the floorboard 10 and having its other end secured to the throttle lever 18 of the carburetor 19 operatively connected to the motor generally indicated by the numeral 20. A plate 21 is positioned longitudinally of and between the pedal 12 and the floorboard 10 and has one end connected to the brackets 11 adjacent their lower ends for up and down movement about an axis transverse of the bracket pin 22. On the upper face of the plate and extending inwardly from the tip end thereof is an arcuate track 23 which is engaged by a roller 24 carried by the under face of the pedal 12 adjacent the rest 14.

Projecting perpendicularly from the under face of the floorboard 10 are a pair of fixed brackets 25, the lower end of which is pivotally connected as at 25' to the intermediate portion of a lever 26. The lever 26 has one arm 27 extending slidably through an opening 28 formed in the floorboard 10, the free end of the arm 27 carrying a roller 29 which engages the under face of the plate 21 adjacent the track 23. The other arm 30 of the lever 26 is pivotally connected intermediate its ends as at 31 to the piston rod 32 projecting from the hydraulic brake cylinder 33, the arm 30 extending through an opening 34 formed in the vehicle floor 35 with its free end connected to one end of a coil spring 36 positioned below the vehicle floor 35 and having its other end connected to a depending lug 37 carried by the vehicle floor 35.

In operation of the thus described motor control and brake pedal device, and assuming that the operator is desirous of applying the brake, a downwardly directed foot pressure is applied to the rest 14 of the pedal 12, resulting in the formation of slack in the chain 16 and movement of the arm 27 of the lever 26 downwardly and the piston rod 32 inwardly of the brake cylinder 33, the dotted line position of Figure 1, and application of the vehicle brakes. Upon release of such pressure the roller 29 carried by the arm 27 of the lever 26 bearing against the under face of the lever 26 causes the track 23 of the plate 21 to transmit upwardly directed force to the rest 14 of the pedal through the roller 24, restoring the pedal 12 and the associated elements to neutral or full line position of Figure 1. Should the operator desire to accelerate the motor, downwardly directed foot pressure is applied to the support 15, causing the footrest to move upwardly and exert a pulling force upon the chain 16 and opening the throttle lever 18 against the tension of the spring 18'. Release of this downwardly directed pressure to the heel support restores the brake pedal and the associated chain to the full line position indicated in Figure 1.

Relative to the form of Figure 3, this is the same as the form of Figure 1, except that the plate 21 is omitted, the footrest 14 of Figure 1 is replaced by a fixed overhanging arm, the chain 16 of Figure 1 is replaced by a rod assembly, and a means is provided for guiding the rocking movement of the pedal. In the form of Figure 3, the pedal 12 has an overhanging arm 40 adjacent its upper end for engagement of the shoe tip of the vehicle operator. The pedal 12 is connected to the throttle lever 18 by means of a rod assembly indicated generally by the numeral 41, such assembly comprising a rod 42 having one end pivotally connected to the throttle lever 18, the other end portion of the rod 42 being threaded and extending freely through an aperture in a lug 43 provided on one end of a link rod 44, the other end of the link rod being pivotally connected to the upper end of the pedal 12. Stop nut 45 is provided on the other threaded end portion of the rod 42. The means for guiding the rocking movement of the pedal 12 comprises a guide rod 46 which is pivotally and slidably connected to the under face of the pedal 12 by a pin and slot connection 47, the guide rod 46 being slidably received in a guide sleeve 48 secured to the under face of the floorboard 10. The guide rod 46 extends slidably through the floorboard 10 and through the sleeve 48 as is clearly shown in Figure 3.

In operation of the form of Figure 3, assuming that the operator is desirous of applying the vehicle brakes, a downwardly directed force is applied to the upper or tip portion of the pedal 12, resulting in movement of the lug 43 of the rod 44 toward the throttle lever 18 and along the rod 42 and movement of the arm 27 of the lever 26 downwardly and of the piston rod 32 inwardly of the brake cylinder, and consequent application of the vehicle brakes. Upon release of such pressure the roller 29 carried by the arm 27 of the lever 26 bearing against the under face of the pedal 12 causes the restoration of the pedal to its neutral position or the position shown in Figure 3. To effect acceleration of the motor 20 a downwardly directed force is applied to the heel support 15, resulting in a pulling force to be applied to the rod 42 by means of the lug 43, stop nut 45, and rod 44 to cause the opening of the throttle lever 18. Release of such pressure upon the heel support 15 restores the pedal 12 and the throttle lever 18 to the neutral position or that shown in Figure 3.

The form of Figures 4 and 5 is the same as the form of Figure 1, except that the plate 21 is omitted, the footrest 14 of Figure 1 is replaced by a movable overhanging arm, and a means is provided for guiding the rocking movement of the pedal which is different than the means provided in the form of Figure 3. In the form of Figures 4 and 5, the pedal 12 has an arm 50 which is connected to the upper end of the pedal for swinging movement from a position overhanging the tip portion of the pedal, the position shown in full lines in Figure 4, to a position away from such tip portion or the position shown in dotted lines in Figure 4, or about an axis indicated by the numeral 51 which is transverse of the pedal. In the overhanging position of the arm 50 the side edges of such arm releasably lockingly engage inwardly directed detent elements 52 carried by opposed resilient latch members 53 secured to the pedal 12. The means for guiding the rocking movement of the pedal 12 comprises a pair of arcuate upstanding guide bars 54 secured to the floorboard 10 in upstanding parallel relation adjacent the tip portion of the pedal 12.

In operation of the form of Figures 4 and 5, and assuming that the operator is desirous of accelerating the motor, a force is applied to the latch members 53 to flex them outwardly, allowing the arm 50 to be disengaged from the detent elements 52, and hence the released arm is swung to the position away from the pedal or the dotted line position of Figure 4. Then, a downwardly directed force is applied to the heel support 15, resulting in a pulling force to be applied to the chain 16 to cause opening of the throttle lever 18. Release of such pressure upon the heel support 15 restores the pedal 12 and the throttle lever 18 to the neutral position or position shown in Figure 4. When it is desired to apply the vehicle brakes, a downwardly directed force is applied to the upper or tip portion of the pedal 12, resulting in the formation of slack in the chain 16 and movement of the arm 27 of the lever 26 downwardly and the piston rod 32 inwardly of the brake cylinder 33 and application of the vehicle brakes. Upon release of this pressure the roller 29 carried by the arm 27 of the lever 26 bearing against the under face of the pedal 12 causes the pedal to be restored to its neutral position or the position shown in Figure 4.

This application is a continuation-in-part of application Serial No. 409,840, filed February 12, 1954, now Patent No. 2,764,134.

Having thus described the invention what is new and desired to be secured by Letters Patent is:

1. The combination with a vehicle having a floorboard, a pair of fixed brackets projecting perpendicularly in parallel spaced relation from the upper face of said floorboard, and another pair of fixed brackets projecting perpendicularly in parallel spaced relation from the under face of said floorboard, of a motor and brake pedal device, said device comprising a pedal positioned longitudinally of and spaced above said floorboard and connected intermediate its ends to the upper ends of said first named pair of brackets for rocking movement about an axis transverse of the latter, means on the portion of said pedal above said axis for supporting the shoe sole of an operator, a heel support on the portion of said pedal below said axis for supporting the shoe heel of an operator, the upper end of said pedal being adapted to be connected to a throttle lever, a plate positioned longitudinally of and between said pedal and floorboard and having one end connected to said first named pair of brackets adjacent their lower ends for up and down movement about a second axis transverse of the latter named brackets, means on the upper face of said plate and engaging the under face of said pedal adjacent the portion above said first named axis for application of pressure thereto, a lever positioned longitudinally of and below said floorboard and pivotally connected intermediate its ends to the lower ends of the second named pair of brackets, said lever having one arm extending slidably through said floorboard, a roller on the free end of said one arm and rollably engaging the under face of said plate adjacent said means on the upper face of said plate for application of pressure thereto, said lever having another arm adapted to be connected intermediate its ends to a piston of a brake cylinder.

2. The combination with a vehicle having a floorboard, a pair of fixed brackets projecting perpendicularly in parallel spaced relation from the upper face of said floorboard, and another pair of fixed brackets projecting perpendicularly in parallel spaced relation from the under face of said floorboard, of a motor and brake pedal device, said device comprising a pedal positioned longitudinally of and spaced above said floorboard and connected intermediate its ends to the upper ends of said first named pair of brackets for rocking movement about an axis transverse of the latter, a roller carried by the under face of said pedal adjacent the upper end, means on the portion of said pedal above said axis for supporting the shoe sole of an operator, a heel support on the portion of said pedal below said axis for supporting the shoe heel of an operator, the upper end of said pedal being adapted to be connected to a throttle lever, a plate positioned longitudinally of and between said pedal and floorboard and having one end connected to said first named pair of brackets adjacent their lower ends for up and down movement about a second axis transverse of the latter named brackets, a curved track on the upper face of said plate and rollably engaging said pedal roller, a lever positioned longitudinally of and below said floorboard and pivotally connected intermediate its ends to the lower ends of the second named pair of brackets, said lever having one arm extending slidably through said floorboard, another roller on the free end of said one arm and rollably engaging the under face of said plate adjacent said track for application of pressure thereto, said lever having another arm adapted to be connected intermediate its ends to a piston rod of a brake cylinder.

3. The combination with a vehicle having a floorboard, of a motor and brake pedal device, said device comprising a pedal positioned longitudinally of and spaced above said floorboard and connected intermediate its ends to said floorboard for rocking movement about an axis transverse of the latter, means on the portion of said pedal above said axis for supporting the shoe sole of an operator, a heel support on the portion of said pedal below said axis for supporting the shoe heel of an operator, the upper end of said pedal being adapted to be connected to a throttle lever, a plate positioned longitudinally of and between said pedal and floorboard and having one end connected to said floorboard for up and down movement about a second axis transverse of the floorboard, means on the upper face of said plate and engaging the under face of said pedal adjacent the portion above said first